(12) United States Patent
Trionfetti

(10) Patent No.: US 11,103,971 B2
(45) Date of Patent: Aug. 31, 2021

(54) BALANCING PROCESS AND DEVICE FOR A ROTATING BODY

(71) Applicant: Gianni Trionfetti, Agrate Brianza (IT)

(72) Inventor: Gianni Trionfetti, Agrate Brianza (IT)

(73) Assignee: BALANCE SYSTEMS S.R.L., Milan (IT)

(*) Notice: Subject to any disclaimer, the term of this patent is extended or adjusted under 35 U.S.C. 154(b) by 0 days.

(21) Appl. No.: 14/043,257

(22) Filed: Oct. 1, 2013

(65) Prior Publication Data

US 2014/0094091 A1    Apr. 3, 2014

(30) Foreign Application Priority Data

Oct. 2, 2012 (EP) .................................... 12187044

(51) Int. Cl.
| | | |
|---|---|---|
| *B24B 41/04* | (2006.01) | |
| *G01M 1/32* | (2006.01) | |
| *G01M 1/36* | (2006.01) | |
| *G01M 1/02* | (2006.01) | |
| *G01M 1/22* | (2006.01) | |

(52) U.S. Cl.
CPC ............ *B24B 41/042* (2013.01); *G01M 1/02* (2013.01); *G01M 1/22* (2013.01); *G01M 1/32* (2013.01); *G01M 1/36* (2013.01)

(58) Field of Classification Search
CPC ..... B24B 41/04; B24B 41/042; B24B 41/007; B24B 23/03; B24D 5/165; B23Q 11/0035; G01M 1/32
See application file for complete search history.

(56) References Cited

U.S. PATENT DOCUMENTS

| | | | |
|---|---|---|---|
| 3,698,263 A | 10/1972 | Ito | |
| 4,977,510 A * | 12/1990 | Winzenz et al. | ............... 701/124 |
| 5,688,160 A * | 11/1997 | Pozzetti et al. | ..................... 451/5 |
| 7,717,013 B2 * | 5/2010 | Hildebrand | ......... F16F 15/1414 |
| | | | 464/180 |
| 2004/0115017 A1 * | 6/2004 | Trionfetti | ................ G01M 1/36 |
| | | | 409/141 |
| 2006/0005623 A1 | 1/2006 | Hildebrand et al. | |
| 2006/0065415 A1 * | 3/2006 | Berg | ................................. 173/2 |

(Continued)

FOREIGN PATENT DOCUMENTS

| | | | | |
|---|---|---|---|---|
| EP | 0 409 050 A2 | 1/1991 | | |
| EP | 0409050 A2 * | 1/1991 | .............. | F16F 15/32 |

(Continued)

OTHER PUBLICATIONS

Machine Translation of WO 2009/156094.*

(Continued)

*Primary Examiner* — Michael D Jennings
*Assistant Examiner* — Abbie E Quann
(74) *Attorney, Agent, or Firm* — Vorys, Sater, Seymour and Pease LLP

(57) ABSTRACT

Provided is a balancing device for a rotating body including at least one unbalance detector to measure the unbalance of the rotating body; two balancing masses to be handled along a handling circumference so as to cancel the unbalance; a position sensor to detect the mutual position of the balancing masses; and a motor to independently handle each of the balancing masses as a function of their mutual position and unbalance.

18 Claims, 3 Drawing Sheets

(56) References Cited

U.S. PATENT DOCUMENTS

2009/0016489 A1* 1/2009 Danz .................. H01J 35/101
378/94
2011/0036166 A1* 2/2011 Lenz .................. G01M 1/16
73/455

FOREIGN PATENT DOCUMENTS

| WO | WO 9853291 A1 * | 11/1998 | ............. G01M 1/08 |
| WO | 2009/156094 A1 | 12/2009 | |
| WO | WO-2009156094 A1 * | 12/2009 | ............. G01M 1/36 |

OTHER PUBLICATIONS

WO2009156094 translation (Year: 2009).*
European Search Report issued for EP Application No. EP 12 18 7044, two pages, completed Mar. 12, 2013.

* cited by examiner

BALANCING PROCESS AND DEVICE FOR A ROTATING BODY

FIELD OF THE INVENTION

Subject of the present invention is a balancing device and process for a rotating body that are apt to recover the rotational imbalances of a tool.

In detail, they are associated to a grinding machine and to be precise, to a grinding wheel so as to cancel its rotational unbalances and then ensure its proper operation.

DESCRIPTION OF THE PRIOR ART

It is known that tools, and particularly grinding wheels, must be almost perfectly balance with respect to their rotation axis, namely, they must have their own mass center along their rotation axis, in order not to produce undesired vibrations, so determining a low quality working and various drawbacks.

In order to avoid such problems, whenever a grinding wheel is placed on the grinding machine, the operator balances by means of suitable devices and counter-weights.

Despite the initial balancing, the grinding wheel consumed tends to change its own mass center and then to move it away from its rotation axis. In fact, when performing a processing, the grinding wheel is subject to deformations and wears which modify its geometry, causing an unbalanced condition.

The balancing devices and processes apt to evaluate the rotational unbalance of the grinding wheel are then apt to continuously change the position of the mass center of the grinding wheel so further balancing it.

They generally comprise two mutually moveable masses and apt to cancel the unbalances that are present, one sensor apt to detect the unbalance of the grinding wheel and one control equipment apt to control the motion of the masses as a function of the unbalance.

The known technique cited before has some important drawbacks.

One first important drawback is due to the fact that the known devices perform the balancing through a particularly long process, as the moving of the masses is done in a substantially casual way. In fact, the balancing process provides that once having detected the unbalance, the masses be moved to a position, the unbalance variation be measured with respect to the previous position. If the result is not as expected, namely if the grinding wheel is not correctly balanced, the process is repeated until a position of the masses is detected which is able to cancel the unbalance of the grinding wheel.

A further drawback is therefore identifiable in that, due to the slowness of the balancing process, the machine cycle times are increased.

One further defect is that, due to the wear of the grinding wheel and the need of having a constant tangential speed, the known devices are not able to perform the balancing of the grinding wheel and therefore the operator is forced to interrupt the machining by setting-up the machine.

An important problem is further identified in that, the known balancing devices are not able to perform in an optimal way the dynamic balancing of a rotating body, namely the balancing of the unbalances along section planes passing through the axis of the grinding wheel. Such unbalances are called dynamic due to the fact that unbalances are detected on two planes during the rotation of the grinding wheel, which generates centrifugal forces creating said unbalance.

In particular, said defect is important with rotating grinding wheels having a great axial extension, like those used for machining the gears.

SUMMARY OF THE INVENTION

In this situation the technical task according to the present invention is to provide for a balancing device and a process for a rotating body, in order to substantially overcome the cited drawbacks.

This object is achieved by a balancing device, for a rotating body, comprising: at least one unbalance detector apt to measure the unbalance of the rotating body; at least one balancing head comprising two balancing masses, apt to be handled along a handling circumference so as to cancel the unbalance of the rotating body, and at least one position sensor apt to detect the position of the balancing masses; at least one motor apt to independently handle each other the balancing masses as a function of the position of the balancing masses and of the unbalance of the rotating body.

Within such technical task an important aim of the invention to obtain a balancing device and process which assure an almost perfect and quick balancing of a rotating body.

A further important aim of the invention is therefore to provide for a balancing device and process apt to permit high quality productions.

A further aim of the invention is to design a balancing device and process able to ensure an optimal static and dynamic balancing of the grinding wheel. The technical task and the specified aims are reached by balancing device and process for a rotating body, as claimed by the annexed independent Claims.

BRIEF DESCRIPTION OF THE DRAWINGS

Features and advantages of the invention are hereafter clarified from the detailed description of a preferred embodiment of the invention, with reference to annexed drawings, in which.

DESCRIPTION OF THE PREFERRED EMBODIMENTS

Figure 1:
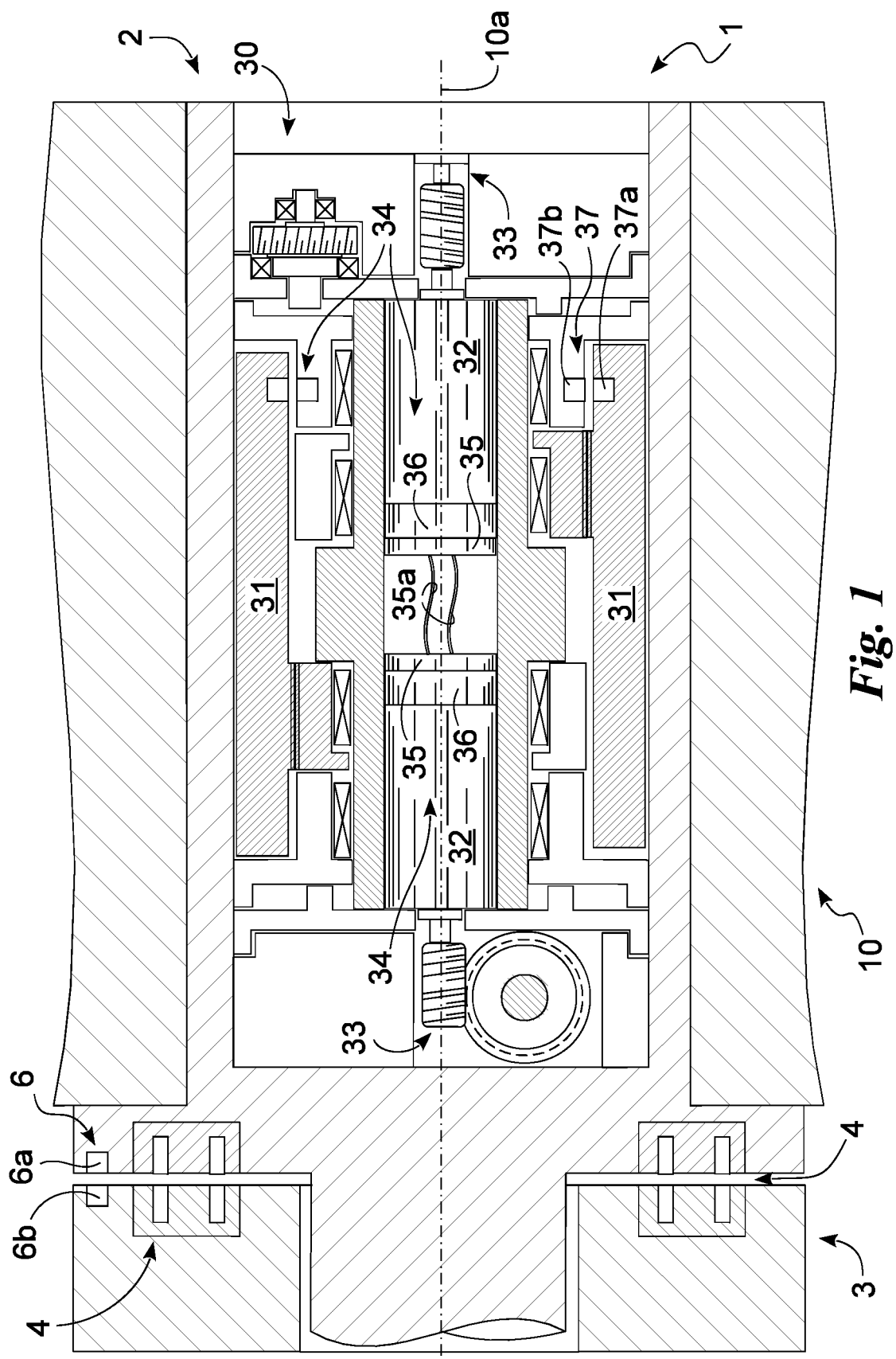
FIG. 1 shows a balancing device for a rotating body according to the invention.

With reference to cited Figures, a balancing device for a rotating body is globally indicated with reference number 1.

It is apt to be associated to a rotating body 10, able to be put in rotation around a rotation axis 10a, so as to balance at least one of its unbalance typology. In detail, the device 1 is apt to be firmly bound to the rotating body 10 and, more precisely, to be housed inside the rotating body 10, along the axis of the same, so as to rotate around the axis 10a and integrally with it.

Preferably, the balancing device 1 is apt to be used in a tool, more preferably a grinding machine or more precisely to be associated to a grinding wheel being the rotating body 10, so as to measure and cancel its unbalance during the execution of a processing.

The rotating body 10 or tool is itself part of a machine tool 20 comprising a rotating portion 21, integral with the rotating body, a fixed portion 22 and a control unit 23 apt to control the operation of the balancing device.

The balancing device 1 mainly comprises a rotating portion 2 apt to be integrally bound preferably to the inside of the rotating body 10, and to the rotating portion 21 so as to rotate around the rotation axis 10*a*; and a fixed portion 3, apt to be bound to the fixed portion 22 adjacent to the rotating portion 2 and to be connected with the control unit 23 by wire.

In particular, the rotating portion 2 and the fixed portion 3 are electrically connected by means of a connection without contact, in particular of the inductive type.

The connection between rotating portion 2 and fixed portion 3 is obtained by means of two coils 4 the one being bound to the rotating portion 2 and another one to the fixed portion 3 and apt to mutually communicate by induction, and more precisely, by taking advantage of a variation of the magnetic field in a coil 4 in order to create in the other coil 4 a current proportional to such variation of magnetic field.

Figure 3:
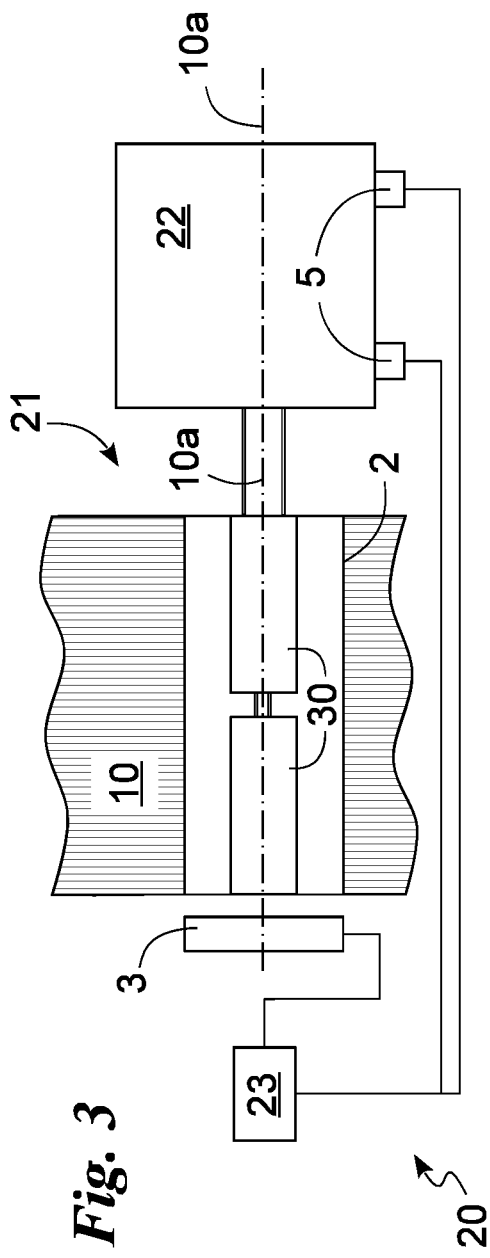
FIG. 3 shows a balancing system including the device according to the invention.

An example of such wireless connection is described in patent IT-A-M15090100 (see from page 3 row 23 to page 8 row 10 and FIGS. 1, 3 e 4) owned by the same applicant.

The balancing device 1 further comprises at least one unbalance detector 5 apt to measure the unbalance of the rotating body 10 and placed at the fixed portion 22 and electrically connected to the control unit 23; and at least one a balancing head 30 apt to balance again the rotating body 10 in function of the unbalance measured by the unbalance detector 5.

Figure 2:
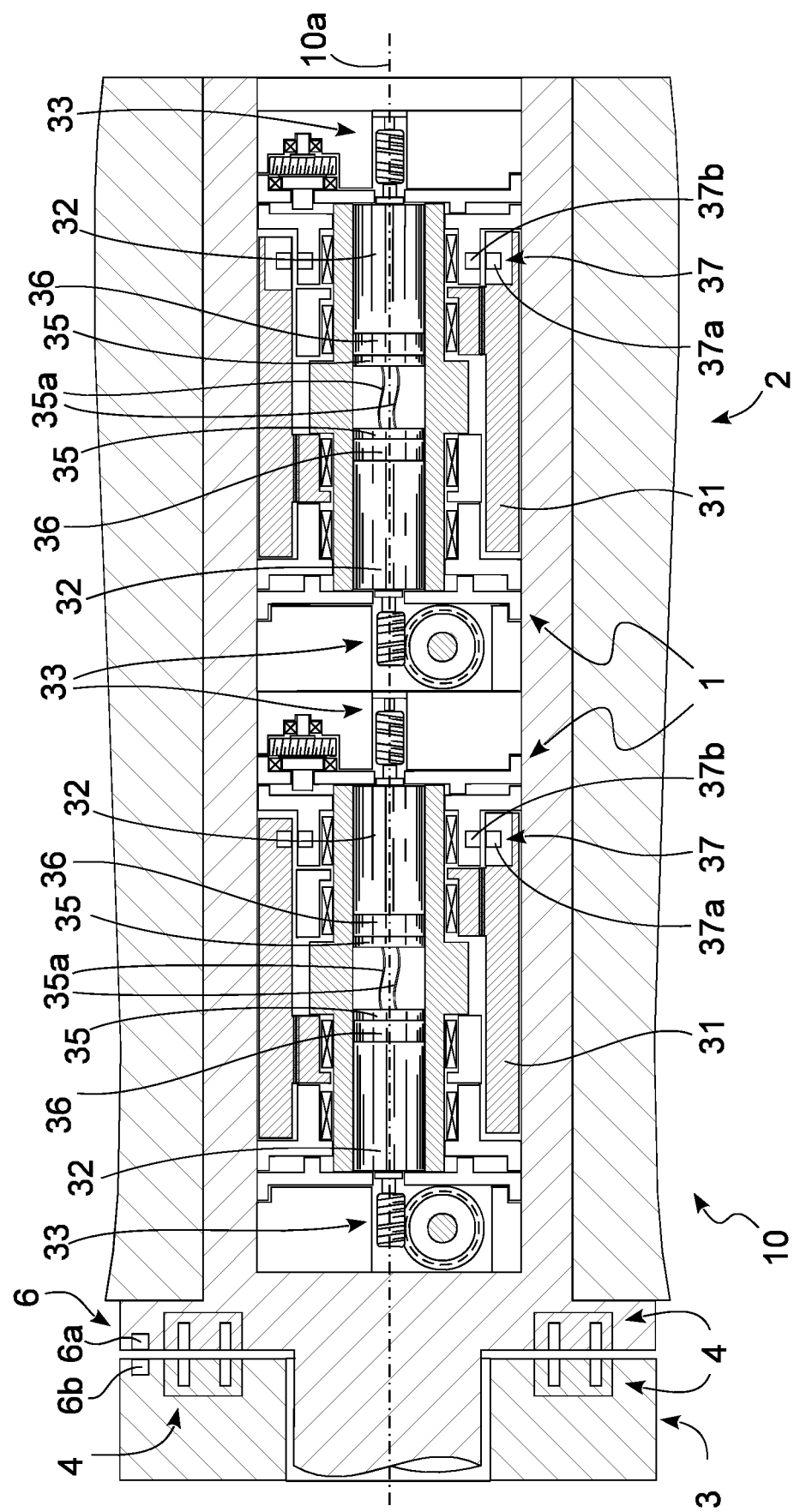
FIG. 2 shows another balancing device on two planes according to the invention.

In particular, in the case in which the rotating body 10 has a great extension along the rotation axis 10*a* with respect to the length of the diameter, such as in particular the grinding wheels for gears, the balancing device 1 suitably has two balancing heads 30 (FIG. 2), housed at the inside of the rotating portion 3, firmly bound to the rotating body 10 at the bases of the rotating body 10 itself.

The unbalance detector 5 can be identified in any sensor, suitably a piezoelectric one, apt to measure the unbalance of the rotating body 10. Preferably, the unbalance detector 5 can be identified in the sensor described in Patent EP-A1645362 (paragraphs [0031]-[0082], FIG. 1 e FIGS. 5-10) owned by the same applicant.

The balancing head 30 is similar to the balancing heads described in Patents EP-A-0409050 (from column 3 line 34 to column 5 line 53 and FIGS. 1-3) or ITA-M15081953 (from page 3 line 12 to page 8 line 8 and FIGS. 1, 2*a* e 2*b*), both owned by the same applicant.

Each head 30 therefore comprises two balancing masses 31 apt to be handled so as to cancel the unbalance of the rotating body 10, at least one motor 32 apt to independently handle of each other the balancing masses 31 and a transmission mechanism 33 apt to transmit the motion from the motors 32 to the balancing masses 31.

In particular, each balancing head 30 comprises two motors 32, one for each balancing mass 31, by symmetrically extending along the rotation axis 10*a*. Suitably the motors 32 are motors of electrical type, or more suitably are motors of the BC type.

The balancing masses 31 are substantially the same and they preferably have a profile in the shape of an arc of circumference, substantially centered on the rotation axis 10*a*. They are apt to be translated along a handling circumference substantially concentric with the rotation axis 10*a* and lying on a plane substantially perpendicular to the rotation axis 10*a*.

The transmission mechanism 33, known per se, defines a transmission ratio among balancing masses 31 and motors 32, substantially comprised between 1/8000 and 1/1500 and, preferably substantially equal to 1/10000.

Advantageously, each balancing head 30 comprises, in addition to aforesaid components, at least one position sensor 34 apt to monitor the position of the balancing masses 31; and at least one control card 35 apt to transmit the incoming signals, and also preferably to have them arrive to the motors 32.

The position sensor 34 is apt to detect the absolute position of any single balancing mass 31 along the handling circumference so as to permit to the motors 32 to control the mutual handling of the masses 31 along the same circumference, as a function both of their initial position and of the unbalance of the rotating body 10, as detected by the unbalance detector 5.

In particular, each position sensor 34 comprises a displacement sensor 36, apt to verify the handling and moving of the masses 31. In detail the displacement sensor 36 is made by an encoder, functionally connected with a single motor 32 and apt to detect the actuation and the respective number of revolutions of portions of them, and the consequent handling of the connected balancing mass 31.

The precision of the displacement sensor 36 made by the encoder is high when considering said transmission ratio between balancing masses 31 and motors 32, so that after a complete revolution of one motor a rotation of the mass 31 follows at an angle, with respect to the axis 10*a*, of 1/10000 of a turn, namely approximately of one thirtieth of a degree.

The position sensors 34 comprise at least one reference sensor 37, apt to determine the position of the masses 31 with reference to the rotating portion 2, for at least one angular position. It is preferably made of a magnetic element 37*a* placed on each mass 31 and of a sensible element 37*b* interfaced with said magnetic element 37*a*.

Through the presence of the reference sensor 37 and of the displacement sensor 36, the position sensors are then apt to determine, at each instant, the position of the single masses 31 with reference to the rotating portion 2.

The control card 35 is made of an electronic card. One single card 35 is properly provided for each motor 32 and positioned at one end of the motor 32 itself. It receives at its entry, and preferably also at its exit, the analogical signals coming from the position sensors 34 coupled to an individual motor 32. In particular, the control card 35 receives signals from the displacement sensor 36 and preferably also from the reference sensors 37. Said card 35 is apt to preferably convert the received signals from analogical to digital ones. The digital signal is then transmitted by two electric wires 35*a* at the exit of the rotating portion 2. The same functions are preferably performed also at the entry of signals in the motors.

Furthermore, suitably due to the fact that the rotation portion 2 preferably comprises two or four motors 32, and consequently two or four cards 35 the same two wires 35*a* transfer the signal from and to a plurality of cards 35 and preferably from all cards 25, so as to substantially create a network made of the same cards 35.

Such solution permits to have two electric wires 35*a* outgoing from the balancing head 30 against the plurality of electric wires, two for each card 35 and then at least four or eight, which would have been necessary in the absence of such innovation. Such plurality of wires would cause important assembling problems in the passage of the wires.

The control card 35 is easily realized by one skilled in the art according to his own common general knowledge.

The balancing device 1 finally comprises detection means 6, apt to measure the angular position a of the rotating body 10 with respect to the rotation axis 10a, in particular during the execution of a processing.

Such detection means 6 comprise at least one magnet 6a, selectively bound to the rotating portion 2 or to the fixed portion 3, and one Hall sensor 6b or any other similar sensor apt to detect such magnetic field and selectively placed in front of the magnet 6a either on the fixed portion 3 or on the fixed portion 2.

In particular, the detection means 6 comprise two magnets 6a symmetrically placed with respect to the rotation axis 10a and bound to the rotating portion 2 so as to face the fixed portion 3 and one Hall sensor 6b bound to the fixed portion 3 and facing the rotating portion 2.

The function of a balancing device for a rotating body, described before in a structural sense, is as follows.

In particular, the function of the balancing device 1 defines a novel balancing process for a rotating body 10.

This balancing process briefly comprises a start-up phase, a measurement phase, in which at least the unbalance of the rotating body 10 is measured, and a balancing phase, in which the two balancing masses 31 are moved along the circumference of handling.

Initially, in the start-up phase, the device 1 measures the initial position in which the balancing mass 31 are placed along the circumference of handling by means of the sensors 34.

Having defined the initial position, the start-up phase is ended and the operator sets in rotation the rotating body 10 around the rotation axis 10a so starting the processing.

Simultaneously with the starting of the processing the balancing device 1 begins to measure the unbalance of the rotating body 10 so starting the measurement phase which therefore is partially combined with the processing, in particular at the processing dead times the unbalance is measured.

Figure 4:
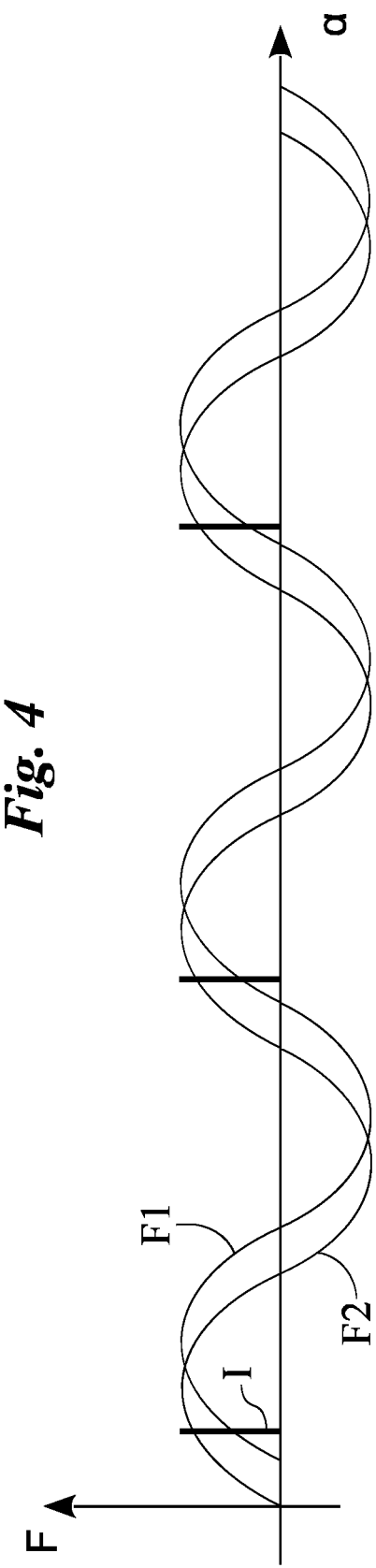
FIG. 4 shows possible measurements of the balancing device.

In detail, during such measurement phase, the unbalance detector 31 detects the unbalance of the rotating body 10 along a predetermined angular position, one example of such detection is given in FIG. 4, which shows the force F (F1 or F2 as preferably two unbalance detectors 5 are provided) on the ordinate and the position angle α of the rotating body in the abscissa, whereas the position sensor 34 detects the position of the balancing masses 31 along the handling circumference.

Furthermore, in such phase, the detection means 6 measure, taking advantage of the Hall effect, the angular position a of the rotating portion 2 with respect to the fixed portion 3, namely the angular position of the rotating body 10. In FIG. 4, an example is given of the measurement of the angular position a of the rotating body 10 in which the peaks correspond to the overlapping of the pulses I given by the magnets 6a to the Hall sensor 6b.

In the measurement phase then the position is determined which the balancing masses 31 must take in order to realize the balancing of the detected unbalance. In particular, by comparing the graph of the unbalance given by the forces F1 and F2 with that of the angular position a, given by the pulses I, the control unit 23 identifies the position which the balancing masses 31 must take in order to cancel the unbalance.

Should the unbalance exceed a determined threshold, or would it be simply detected, the balancing phase is activated in which the motors 32, controller by the control unit 23, mutually translate the balancing masses 31 along the circumference, as a function of their initial position, namely of the balancing which is being performer, measured by the position sensor 34 and the unbalance detected by the unbalance detector 5.

Furthermore, tank to the identification of the position of the balancing masses 31 along the handling circumference, the control unit 23 compares the position of the masses 31 with the one to be taken in order to cancel the identified unbalance. Displacement direction and module are then determined of the displacement to be performer by each balancing mass 31, controlled to the motors 32 and performed by the same. Consequently, the balancing and handling do not occur by trial but directly from the initial position to the position performing the balancing.

Finally, tanks to the identification of the position of the balancing masses 31, the device 1 provided with two balancing heads 30, permits to perform a dynamic balancing by arranging the masses 32 so as to cancel the dynamic unbalance, namely the unbalance along planes passing through the axis 10a and also the unbalance along two planes.

The invention permits important advantages.

One first important advantage is that, tanks to the position sensor 34 which detects the position of the balancing masses 31 along the circumference the balancing device 1 identifies at any time the position of the masses 31 along the circumference and therefore, it is capable of detecting the displacement of the masses in order to recover the unbalance of the rotating body 10.

In fact, whereas in known devices and processes the position of the balancing masses at any time was practically unknown and therefore the balancing masses 31 had to be casually handled, as the device 1 knows at any time the position of the balancing masses 31, is capable to easily identify how to handle the same masses.

Such capacity is further enhanced due to the fact that, tank to the detection means 6, the device 1 and process, by detecting the angular position a of the rotating body 10, identify the position which the balancing masses 31 must take in order to cancel the unbalance.

Another advantage is that, due to the presence of the position sensor 34 and furthermore, of the detection means 6, the balancing device 1 and process cancel the unbalance in extremely short times.

So they permit, unlike it happened with the known devices and processes, that the grinding machine has particularly high efficiency and precision.

Another important advantage is that, thanks to a reduced transmission ratio among the motors 32 and the masses 31, the device 1 performs a particularly precise positioning of the masses 31 and then capable of ensuring an almost total cancellation of the unbalance of the rotating body 10.

One further advantage is that, by arranging two balancing devices 1 on a rotating body 10 having a great axial extension, it is possible to ensure a rotational balance which is both static and dynamic, namely along two planes.

The invention is susceptible of variation within the inventive concept. All described and claimed elements can be substituted with equivalent elements and details, materials, shapes and sizes may be any.

The invention claimed is:
1. A grinding machine, comprising:
a grinding wheel defining a rotating body and
at least one balancing device;

wherein said at least one balancing device is housed inside said rotating body and comprises:
at least one unbalance detector configured to measure the unbalance of said rotating body;
at least one balancing head configured to be firmly housed inside said rotating body and comprising two balancing masses configured to be handled along a handling circumference so as to cancel said unbalance of said rotating body,
one motor for each one of said two balancing masses configured for handling said balancing mass; and
a transmission mechanism configured for transmitting the motion from the said motors to said balancing masses;
said at least one of said balancing heads comprising at least one position sensor configured to detect, at each instant, the absolute position of each of said balancing masses along the handling circumference,
each of said at least one position sensor comprising a displacement sensor configured to verify the handling and displacement of said masses and being an encoder, functionally directly connected with a respective one of said motors, said respective motor, said transmission mechanism, and said encoder being axially aligned; said encoder configured for detecting the actuation and the respective number of revolutions or portions of revolutions of the respective motor, and
reference sensor to determine the position of said masses with reference configured to the remaining portion of said balancing head, for at least one mutual angular position; and
said motors configured to independently handle each of said balancing masses as a function of said position of said balancing masses and of said unbalance of said rotating body.

2. The grinding machine according to claim 1, wherein said encoder is functionally connected with one of said motors.

3. The grinding machine according to claim 1, further comprising a control card to receive entry signals from said position sensors coupled to at least one of said motors and at least two electric wires to transfer the signals from a plurality of said control cards at the outside of said device.

4. The grinding machine according to claim 3, wherein said control card converts the signals received from said position sensors from analogical to digital, so as to realize a network made of said control cards connected by said electric wires.

5. The grinding machine according to claim 4,
said balancing device comprising detection means to measure the angular position of said rotating body with respect to said rotation axis;
wherein said motors handle said balancing masses as a function of said angular position, in which said detection means comprise at least one magnet and one Hall sensor,
wherein the balancing device comprises a rotating portion integrally bound to an inside of the rotating body; and
wherein the motors for moving the masses are inside the rotating portion.

6. The grinding machine according to claim 1,
wherein the balancing device comprises a rotating portion integrally bound to an inside of the rotating body; and
wherein the motors for moving the masses are inside the rotating portion.

7. The grinding machine according to claim 1, wherein said rotating body defines a rotation axis; said balancing device comprising detection means to measure the angular position of said rotating body with respect to said rotation axis; and wherein said motors handle said balancing masses as a function of said angular position.

8. The grinding machine according to claim 7, in which said detection means comprise at least one magnet and one Hall sensor.

9. The grinding machine according to claim 1, comprising two of said balancing heads arranged side-by-side along the same axis to balance dynamic unbalances.

10. A balancing process for using the grinding machine of claim 1 associated with a rotating tool defining a rotating body, comprising: a measurement phase in which unbalance of a rotating body is measured, a balancing phase in which two balancing masses are handled so as to cancel said unbalance of said rotating body; wherein at said measurement phase the absolute position along the handling circumference of said balancing masses is measured, which performs the balancing of said unbalance; and wherein at said balancing phase, said balancing masses are directly handled from the initial position to said position which performs the balancing of said unbalance.

11. The grinding machine according to claim 10, wherein said rotating body defines a rotation axis; at said measurement phase, an angular position is detected with respect to said rotation axis; and wherein, at said balancing phase, said balancing masses are handled as a function of said angular position of said rotating body.

12. The grinding machine according to claim 1, wherein each said encoder is located between the motors.

13. A grinding machine, comprising:
a grinding wheel defining a rotating body and
at least one balancing device;
wherein said at least one balancing device is housed inside said rotating body and comprises:
at least one unbalance detector configured to measure the unbalance of said rotating body;
at least one balancing head comprising two balancing masses configured to be handled along a handling circumference so as to cancel said unbalance of said rotating body,
one motor for each one of said two balancing masses configured for handling said balancing mass; and
a transmission mechanism configured for transmitting the motion from the said motors to said balancing masses;
said at least one of said balancing heads comprising at least one position sensor configured to detect, at each instant, the absolute position of each of said balancing masses along the handling circumference,
each of said at least one position sensor comprising a displacement sensor configured to verify the handling and displacement of said masses and being an encoder, functionally directly connected with a respective one of said motors, said respective motor, said transmission mechanism, and said encoder being axially aligned; said encoder configured for detecting the actuation and the respective number of revolutions or portions of revolutions of the respective motor, and
reference sensor to determine the position of said masses with reference configured to the remaining portion of said balancing head, for at least one mutual angular position;
and
a control card to receive entry signals from said position sensors coupled to at least one of said motors and at least two electric wires to transfer the signals from a plurality of said control cards at the outside of said device, wherein said control card converts the signals received from said position sensors from analogical to digital, so as to realize a network made of said control cards connected by said electric wires.

14. The grinding machine according to claim 13, wherein each said encoder is located between the motors.

15. The grinding machine according to claim 13,
wherein the balancing device comprises a rotating portion integrally bound to an inside of the rotating body; and
wherein the motors for moving the masses are inside the rotating portion.

16. A grinding machine, comprising:
a grinding wheel defining a rotating body and
at least one balancing device;
wherein said at least one balancing device housed inside said rotating body and comprises:
at least one unbalance detector configured to measure the unbalance of said rotating body;
at least one balancing head housed inside said rotating body and comprising two balancing masses configured to be handled along a handling circumference so as to cancel said unbalance of said rotating body,
one motor for each one of said two balancing masses configured for handling said balancing mass; and
a transmission mechanism configured for transmitting the motion from the said motors to said balancing masses;

said at least one of said balancing heads comprising at least one position sensor configured to detect, at each instant, the absolute position of each of said balancing masses along the handling circumference, each of said at least one position sensor comprising a displacement sensor configured to verify the handling and displacement of said masses and being an encoder, functionally directly connected with a respective one of said motors, said respective motor, said transmission mechanism, and said encoder being axially aligned; said encoder configured for detecting the actuation and the respective number of revolutions or portions of revolutions of the respective motor, and reference sensor to determine the position of said masses with reference configured to the remaining portion of said balancing head, for at least one mutual angular position.

17. The grinding machine according to claim 14, wherein each said encoder is located between the motors.

18. The grinding machine according to claim 16,
wherein the balancing device comprises a rotating portion integrally bound to an inside of the rotating body; and
wherein the motors for moving the masses are inside the rotating portion.

* * * * *